United States Patent [19]

Haga

[11] Patent Number: 5,472,384
[45] Date of Patent: * Dec. 5, 1995

[54] INTERNALLY MESHING PLANETARY GEAR STRUCTURE, REDUCTION OR STEP-UP GEAR HAVING SAID STRUCTURE, AND METHOD FOR MACHINING SAID REDUCTION OR STEP-UP GEAR

[75] Inventor: Takashi Haga, Ohbu, Japan

[73] Assignee: Sumitomo Heavy Industries Ltd., Tokyo, Japan

[*] Notice: The portion of the term of this patent subsequent to Jun. 21, 2011, has been disclaimed.

[21] Appl. No.: 5,313

[22] Filed: Jan. 15, 1993

[30] Foreign Application Priority Data

Jan. 17, 1992 [JP] Japan ..................... 4-026258
Jan. 17, 1992 [JP] Japan ..................... 4-026260

[51] Int. Cl.$^6$ ........................... F16H 1/32
[52] U.S. Cl. ........................... 475/162; 475/178
[58] Field of Search ..................... 475/162, 176, 475/177, 178, 179

[56] References Cited

U.S. PATENT DOCUMENTS

| | | | |
|---|---|---|---|
| 3,129,611 | 4/1964 | Lee | 475/178 |
| 4,407,170 | 10/1983 | Fukui | 475/162 X |
| 5,222,922 | 6/1993 | Takahashi et al. | 475/178 |
| 5,322,485 | 6/1994 | Haga | 475/162 X |

FOREIGN PATENT DOCUMENTS

| | | | |
|---|---|---|---|
| 548888 | 6/1993 | European Pat. Off. | 475/179 |
| 2570155 | 3/1986 | France | 475/179 |
| 60-260737 | 12/1985 | Japan . | |
| 63-22289 | 1/1988 | Japan . | |
| 927684 | 6/1963 | United Kingdom . | |
| 2117081 | 10/1983 | United Kingdom . | |

*Primary Examiner*—Khoi Q. Ta
*Attorney, Agent, or Firm*—Nikaido, Marmelstein, Murray & Oram

[57] ABSTRACT

The eccentric body shaft bearing holes, the eccentric body bearing holes and the carrier pin holding holes are set to satisfy the following relationship. Namely, when the first and second supporting blocks and the externally toothed gears are appropriately rearranged in the axial positions thereof, the diameters of the eccentric body shaft bearing holes and the diameters of the eccentric body bearing holes become smaller toward one direction. Also, while keeping the above rearrangement, the diameters of the carrier pin holding holes become smaller in the same direction. The outside diameter of the first and second supporting blocks is set to be smaller than the root diameter of the external teeth of each externally toothed gear. Further, the teeth number of each externally toothed gear is set to be the integral magnification of the number thereof, and the teeth number difference between the internal gear and the externally toothed gear is set to be the integral magnification of the number of the externally toothed gears. With this construction, it is possible to simultaneously machine the bearing holes and the externally toothed gears with one setting, and hence to improve the relative positional accuracy of each hole.

4 Claims, 12 Drawing Sheets

INTERNALLY MESHING PLANETARY GEAR STRUCTURE, REDUCTION OR STEP-UP GEAR HAVING SAID STRUCTURE, AND METHOD FOR MACHINING SAID REDUCTION OR STEP-UP GEAR

BACKGROUND OF THE INVENTION

1. Field of the Invention

The present invention relates to an internally meshing planetary gear structure particularly suitable for a reduction gear or a step-up gear requiring a high output with the small size, and a method for machining thereof.

2. Description of the Prior Art

The conventional internally meshing planetary gear structures have disclosed in, for example, Japanese Patent Laid-open No. sho 60-260737, U.S. Pat. No. 3,129,611 and the like. In such a gear structure, a casing is provided, and the tip of a main rotational shaft is inserted into the casing. A first and second supporting blocks are disposed around the main rotational shaft in an axially spaced apart manner. Also, the above supporting blocks are rotatably supported by the casing through respective bearings, and rigidly connected with each other through a carrier body. A plurality of eccentric body shafts are disposed along a circumference coaxial to the main rotational shaft. The above eccentric body shafts are rotatably supported at both the ends thereof by eccentric body shaft bearing holes formed on the first and second supporting shafts through eccentric body shaft bearings, respectively, and are rotated in an interlocking relation with the rotation of the main rotational shaft. Eccentric bodies are provided at the approximately axially central portions of the eccentric body shafts, respectively. Externally toothed gears are provided between the first and second supporting blocks, and eccentrically rotated around the main rotational shaft with the eccentric body bearing holes respectively formed thereon being fitted to the eccentric bodies through the eccentric body bearings, respectively. An internal gear is fixed on the casing for internally meshing with the above externally toothed gears.

FIGS. 10 and 11 shows the conventional internally meshing planetary gear structure of this type.

In these figures, numeral 1 designates a cylindrical casing. The casing 1 has an external flange 2. The tip of an input shaft (main rotational shaft) 3 rotated by a motor (not shown) is inserted into the central portion of the casing 1.

In the casing 1, a first supporting block 4 and a second supporting block 5 are oppositely disposed in an axially spaced apart manner. These first and second supporting blocks 4 and 5 are rotatably supported around the internal periphery of the casing 1 through bearings 6a and 6b.

The second supporting block 5 (in the right side in FIG. 10) has a carrier body 7 (see FIG. 11) having a complex shape and projecting to the first supporting block 4 (in the left side in FIG. 10). Both the supporting blocks 4 and 5 are rigidly connected to each other by bolts 29 and pins 30 through the carrier body 7 having such a complex shape, thus constituting a carrier as a whole.

Also, in the casing 1, three eccentric body shafts 8 are disposed in parallel to the input shaft 3. These eccentric body shafts 8 are circumferentially spaced at equal intervals on a circumference coaxial to the input shaft 3. Both ends of each eccentric body shaft 3 are rotatably supported in eccentric body shaft bearing holes 10a and 10b of the first and second supporting blocks 4 and 5 through eccentric body shaft bearings 9a and 9b, respectively.

The end portion of each eccentric body shaft 8 on the first supporting block 4 side projects outwardly from the portion supported by the eccentric body shaft bearing 9a. Three transmission gear units 13 are mounted on the projecting portion through splines 12. In this case, the transmission gear units 13 are respectively constituted of a pair of gears for preventing the backlash.

The first and second supporting blocks 4 and 5 are formed with center holes 14 and 15 at the radial centers thereof, respectively. The above input shaft 3 passes through the center holes 14 and 15. A pinion 16 meshing with the transmission gear units 13 fixed on each eccentric body shaft 8 is fixed at the tip of the input shaft 3. Accordingly, the rotation of the input shaft 3 is equally distributed to three eccentric body shafts 8 through the pinion 16 and the transmission gear units 13.

In this case, the teeth number of the each transmission gear unit 13 is specified to be larger than that of the pinion 16. Consequently, the rotation of each eccentric body shaft 8 is reduced in correspondence with the gear ratio between the transmission gear unit 13 and the pinion 16.

Two eccentric bodies 17a and 17b are axially lined-up at the approximately axially central portion of each eccentric body shaft 8. These eccentric bodies 17a and 17b are phase-shifted by 180° to each other.

On the other hand, two disk-like externally toothed gears 18a and 18b, each having an outside diameter slightly smaller than the inside diameter of the casing 1, are axially lined-up between the first and second supporting blocks 4 and 5. Each of the externally toothed gears 18a and 18b is provided with three eccentric body bearings holes 19a and 19b, through which the above eccentric body shafts 8 pass respectively. The above eccentric bodies 17a and 17b are fitted to the eccentric body shaft bearing holes 19a and 19b through eccentric body bearings 20a and 20b, respectively. Accordingly, as shown in FIG. 11, the externally toothed gears 18a and 18b are supported in the state where the center Og thereof is eccentric to the rotational center Of of the input shaft 3 by a distance <e>. Thus, these externally toothed gears 18a and 18b are rotated in a rolling (swaying) manner by one rotation around the rotational center Of of the input shaft 3 for each rotation of the eccentric body shaft 8.

As the above eccentric body bearings 20a and 20b, needle bearings are here used. These eccentric body bearings 20a and 20b are axially positioned by stopper plates 21 and 23, and a flange 22 provided on the eccentric body shaft 8.

Each of the above externally toothed gears 18a and 18b has circular arc or trochoid shaped external teeth 24. An internal gear 25 meshing with the externally toothed gears 18a and 18b is disposed on the outer peripheral side of the externally toothed gears 18a and 18b. The internal gear 25 is formed integrally with the casing 1 around the inner periphery of the casing 1. This internal gear 25 has internal teeth constituted of outer pins 26. In addition, the outer pins 26 are secured by a pin pressing ring 27 from the inside for preventing the outer pins 26 from slipping off.

As shown in FIG. 11, insertion openings (inserting-fit holes) 28a and 28b, each having a complex curved contour, are formed at the central portions of the external gears 18a and 18b, respectively. The carrier body 7 of the second supporting block 5 passes through these insertion openings 28a and 28b. Thus, in the state where the end surface of the carrier body 7 is closely contacted with the inner end surface of the first supporting block 4, the first and second supporting blocks 4 and 5 are rigidly connected to each other by the bolts 29 and the pins 30, thereby constituting an integral carrier.

The carrier body 7 is intended to mutually transmit the rotational forces applied on the first and second supporting blocks 4 and 5. The insertion openings 28a and 28b of the externally toothed gears 18a and 18b has a size and a shape enough to prevent the interference with the carrier body 7 even in rolling (swaying) of the externally toothed gears 18a and 18b.

Now, the function of the gear structure will be described.

First, it is here assumed that the casing 1 is fixed, and the rotational output is taken from the carrier constituted of the first and second supporting blocks 4 and 5.

As the input shaft 3 is rotated, three eccentric body shafts 8 are rotated at an equal speed in the same direction (reversed to the rotational direction of the input shaft 3) through the pinion 16 and the transmission gear units 13. As described above, two eccentric bodies 17a and 17b are provided on each of three eccentric body shafts 8. Accordingly, the eccentric bodies 17a and 17b are eccentrically rotated at an equal speed in the same direction, so that two of externally toothed gears 18a and 18b are rotated in a rolling (swaying) manner around the input shaft 3.

In this case, since the casing 1 is fixed, that is, the internal gear 25 is fixed, the externally toothed gears 18a and 18b are rolled while internally meshing with the internal gear 25 in the state where the free rotation is restricted. For example, assuming that the teeth number of the externally toothed gears 18a and 18b are specified at N, and the teeth number of the internal gear 25 is specified at (N+1), the tooth difference is one. Accordingly, the externally toothed gears 18a and 18b are shifted (rotated on its axis) by one tooth with respect to the internal gear 25 for each rotation of the eccentric body shafts 8.

This shifting, that is, the rotations of the externally toothed gears 18a and 18b are transmitted to the first and second supporting blocks 4 and 5 through the eccentric body shafts 8. Since the supporting blocks 4 and 5 are integrated with each other through the carrier body 7, the rotational forces respectively transmitted to the supporting blocks 4 and 5 are combined, and taken from the supporting block 4 or 5 on the output side. In addition, the supporting blocks 4 and 5 are reduced at −1/N rotation for one rotation of the eccentric body shafts 8.

In the above, the function has been described assuming that the casing 1 is fixed and the output is taken from the side of the supporting block 4 or 5. However, the output may be taken from the casing 1 side, with the supporting blocks 4 and 5 being fixed. In this case, a counter-member is connected to the external flange 2 provided on the casing 1. With this arrangement, the reduced output is taken from the casing 1 side at the 1/(N+1) rotation and in the reverse rotation to the above case being taken from the side of the above supporting block 4 or 5.

Thus, the reduced rotational output may be taken from the side of the supporting block 4 or 5, with the casing 1 side being fixed, or may be taken from the casing 1 side, with the supporting blocks 4 and 4 being fixed. The above two types of the gear structures are adapted for reduction gears. In terms of the type of taking the output, the former is called as a carrier rotation type and the latter is called as a casing rotation type.

The conventional structure shown in FIG. 10 is assumed as the casing rotation type. Accordingly, a cover 31 is provided to the opening portion of the casing 1 on the side of the transmission gear units 13.

Incidentally, the gear structure of the casing rotation type or the carrier rotation type can be used as a step-up gear by reversing a relationship between the input and the output.

Next, the conventional gear structure of the carrier rotation type will be briefly described with reference to FIG. 12.

In the carrier rotation type, generally, an output shaft is provided integrally with the supporting block which is on the opposite side to the input shaft. Thus, the reduced rotational output is taken from the output shaft. However, in the conventional structure, the counter-member P on the output side is directly connected to the first supporting block 4. In this gear structure, the reduction mechanism is almost similar to that shown in FIGS. 10 and 11, except that the carrier body 7 for connecting both the supporting blocks 4 and 5 to each other is provided not on the second supporting block 5 but on the first supporting block 4, and the cover 31 is omitted. The main difference lies in that screw holes 32 are formed on the outer surface of the first supporting block 4, and thus the counter-member P is mounted by screwing bolts 33 in these screw holes 32.

In the above two gear structures, for connecting the first and second supporting blocks 4 and 5 to each other, there is used the carrier body 7 formed integrally with the first and supporting block 4 or the second supporting block 5. However, in U.S. Pat. No. 3,129,611, carrier pins (cage bars) are used in place of the carrier body 7 for connection. In each of the carrier pins, both ends thereof are rigidly fixed on the first and second supporting blocks (disks) for connecting both the supporting blocks, thus constituting a carrier (cage).

On the other hand, Japanese Patent Laid-open No. sho 63-22289 proposes the technique of improving the accuracy by simultaneous machining in the planetary gear structure of carrier rotation type disclosed in Japanese Patent Laid-open No. sho 60-260737. The technique in Japanese Patent Laid-open No. sho 63-22289 is essentially similar to that in Japanese Patent Laid-open No. sho 60-260737. Accordingly, the technique will be briefly described with reference to FIG. 10. In order to simultaneously machine eccentric body shaft bearing holes 10a and 10b formed on on respective sides of supporting blocks 4 and 5, and eccentric body bearing holes 19a and 19b on respective sides of externally toothed gears 18a and 18b, the diameters of the above bearing holes 10a, 10b, 19a and 19b are made to be identical to each other, and also the axes of respective holes are made in conformity with each other in the relative positional relationship (pitch circle diameter and pitch).

In recent years, a reduction or step-up gear using the internally meshing planetary gear structure of this type has been further strongly required to be reduced in size and enhanced in accuracy.

However, in the real situation, it has almost reached the limit in terms of the cost to meet the above requirement by enhancing the machining accuracy.

As described above, for example, in Japanese Patent Laid-open No. sho 63-22289, for simultaneously machining the eccentric body shaft bearing holes 10a and 10b on respective sides of the supporting blocks 4 and 5 and the eccentric body bearing holes 19a and 19b on respective sides of the externally toothed gears 18a and 18b, the above bearing holes 10a, 10b, 19a and 19b are made to be identical to each other, and the axes of respective holes are made in conformity with each other in the relative positional relationship (pitch circle diameter and pitch). Notwithstanding, this technique is insufficient to highly improve the machining accuracy.

SUMMARY OF THE INVENTION

Taking the above circumstances into consideration, the present inventors have drastically reviewed the above gear structure. Accordingly, and object of the present invention is to provide a technique of machining a reduction or step-up gear having the higher quality even with the same machine as used in the conventional manner.

In a first aspect (claim 1) of the present invention, there is provided such an internally meshing planetary gear structure as follows:

A casing is provided, and the tip of a rotational shaft is inserted into the casing. A first and second supporting blocks are disposed around the main rotational shaft in an axially spaced apart manner, and are rotatably supported by the casing through respective bearings. Also, the first and second supporting blocks are rigidly connected with each other through a carrier body.

A plurality of eccentric body shafts are disposed along a circumference coaxial to the main rotational shaft. Also, the eccentric body shafts are rotatably supported at both ends thereof by eccentric body shaft bearing holes respectively formed on the first and second supporting blocks, respectively, and rotated in interlocking relation with the main rotational shaft. Eccentric bodies are respectively provided at the approximately axially central portions of the eccentric body shafts. Externally toothed gears are provided between the first and second supporting blocks, and are respectively rotated eccentrically around the main rotational shaft in the rotatable fitting relation between the eccentric body shaft bearing holes respectively formed thereon and the eccentric bodies through the eccentric body bearings. An internal gear is fixed on the casing and internally meshing with the externally toothed gears.

In the above, the diameters of the eccentric body bearing holes are larger or smaller than any one of the diameters of the eccentric body shaft bearing holes respectively formed on the first and second supporting blocks.

In the above structure, the carrier body is constituted of carrier pins separately from the first and second supporting blocks. The first and second supporting blocks are rigidly connected to each other by the carrier pins respectively passing through the eccentric body shaft bearing holes respectively formed on the first and second supporting blocks from one supporting block side.

Also, in the above structure, the eccentric body shaft bearing holes, the eccentric body bearing holes and the carrier pin holding holes are all made to be through-holes. Among the holes, the eccentric body shaft bearing holes respectively formed on the first and second supporting blocks and the eccentric body shaft bearing holes respectively formed on the externally toothed gears are disposed along the same circumference at the same pitch. Further, the carrier pin holding holes respectively formed on the first and second supporting blocks are disposed along the same circumference at the same pitch.

The diameters of the eccentric body shaft bearing holes, the eccentric body bearing holes and the carrier pin holding holes are respectively set to satisfy the following relationship: namely, when the first and second supporting blocks and the externally toothed gears are appropriately rearranged in the axial positions thereof, the diameters of the eccentric body shaft bearing holes respectively formed on the first and second supporting blocks and the diameters of the eccentric body bearing holes respectively formed on the externally toothed gears become smaller in one direction (partially, the diameters may be identical to each other); and, while keeping the above rearrangement, the diameters of the carrier pin holding holes respectively formed on the first and second supporting blocks become smaller in the same direction (partially, the diameters may be identical to each other).

In a second aspect (claim 2) of the present invention, there is provided a reduction or step-up gear having the above internally meshing planetary gear structure. Also, in a third aspect (claim 3) of the present invention, there is provided a method for machining the above reduction or step-up gear.

In a fourth aspect (claim 4), there is provided such an internally meshing planetary gear structure as follows:

A casing is provided, and the tip of a rotational shaft is inserted into the casing. A first and second supporting blocks are disposed around the main rotational shaft in an axially spaced apart manner, and are rotatably supported by the casing through respective bearings. Also, the first and second supporting blocks are rigidly connected with each other through a carrier body.

A plurality of eccentric body shafts are disposed along a circumference coaxial to the main rotational shaft. Also, the eccentric body shafts are rotatably supported at both ends thereof by eccentric body shaft bearing holes respectively formed on the first and second supporting blocks, respectively, and rotated in interlocking relation with the main rotational shaft. Eccentric bodies are respectively provided at the approximately axially central portions of the eccentric body shafts. Externally toothed gears are provided between the first and second supporting blocks, and are respectively rotated eccentrically around the main rotational shaft in the rotatable fitting relation between the eccentric body shaft bearing holes respectively formed thereon and the eccentric bodies through the eccentric body bearings. An internal gear is fixed on the casing and internally meshing with the externally toothed gears.

In the above structure, the carrier body is constituted of carrier pins separately from the first and second supporting blocks. The first and second supporting blocks are rigidly connected to each other by the carrier pins respectively passing through the eccentric body shaft bearing holes respectively formed on the first and second supporting blocks.

Also, in the above structure, the eccentric body shaft bearing holes, the eccentric body bearing holes and the carrier pin holding holes are all made to be through-holes. Among the holes, the eccentric body shaft bearing holes respectively formed on the first and second supporting blocks and the eccentric body shaft bearing holes respectively formed on the externally toothed gears are disposed along the same circumference at the same pitch. Further, the carrier pin holding holes respectively formed on the first and second supporting blocks are disposed along the same circumference at the same pitch.

The diameters of the eccentric body shaft bearing holes, the eccentric body bearing holes and the carrier pin holding holes are respectively set to satisfy the following relationship: namely, when the first and second supporting blocks and the externally toothed gears are appropriately rearranged in the axial positions thereof, the diameters of the eccentric body shaft bearing holes respectively formed on the first and second supporting blocks and the diameters of the eccentric body bearing holes respectively formed on the externally toothed gears become smaller in one direction (the diameters may be identical to each other); and, while keeping the above rearrangement, the diameters of the carrier pin holding holes respectively formed on the first and second supporting blocks become smaller in the same direction (the diameters may be identical to each other).

Further, in the above structure, the outside diameters of the first and second supporting blocks are smaller than the root diameters of respective external teeth portions of the externally toothed gears. Also, the teeth number of each external toothed gear is set to be the integral magnification of the number of the externally toothed gears, and the teeth number difference between the internal gear and each externally toothed gear is set to be the integral magnification of the number of the externally toothed gears.

In the fifth aspect (claim 5), there is provided a reduction or step-up gear having the above internally meshing planetary gear structure. Also, in the sixth aspect (claim 6), there is provided a method for machining the above reduction or step-up gear.

The first to sixth aspects (claims 1 to 6) of the present invention has been made by examining the points which had been not remarked at all.

Namely, conventionally, in the case of providing a plurality of externally toothed gears, it has been regarded to be preferable that respective external teeth portions of the externally toothed gears machined at the same positions are simultaneously meshed with the internal gear during operation. This is because the machining errors thereof are cancelled to each other thereby making the so-called leveling of the errors. In fact, the conventional reduction or step-up gears of this type have been all fabricated on the basis of this thought. However, as a result of the actual examination for this thought, it brings about an undesirable result that respective external teeth portions of the externally toothed gears machined at the same positions are simultaneously meshed with the internal gear.

The fourth to sixth aspects (claims 4 to 6) of the present inventions have been made according to this knowledge. One of the important gists lies in preventing the external toothed portions of the externally toothed gears machined at the same positions from being simultaneously meshed with the internal gear during operation. As the result of the actual experiments, the present inventors have recognized that the machining errors are rather levelled by the above assembling.

In addition, the first to third aspects (claims 1 to 3) of the present invention have been contrived in the step of examining how the assembly is concretely performed in such a manner as not to mesh respective external teeth portions of the externally toothed gears machined at the same positions with the internal gear.

As a result of this examination, the present inventors have found the fact that the most reasonable assembly can be performed by setting the teeth number of each externally toothed gear to be the integral magnification of the number of the externally toothed gears, and further, by setting the teeth number difference between the internal gear and each externally toothed gear is set to be the integral magnification of the number of the externally toothed gears.

Namely, when the number of the externally toothed gears are two as described above, the externally toothed gears are phase-shifted in the maximum eccentric direction by 360°/2=180°. When the number of the externally toothed gears is three, they are phase-shifted in the maximum eccentric direction by 360°/3=120°. This is because the dynamic balance is kept to be preferable during operation by equally distributing the maximum eccentric directions of respective external toothed gears on the circumferential direction.

In the fourth to sixth aspects (claims 4 to 6) of the present invention, the teeth number of the externally toothed gears is set to the integral magnification of the number of the externally toothed gears, and also the teeth number difference between the internal gear and each externally toothed gear is set to be the integral magnification of the number of the externally toothed gears. Thus, the externally toothed gears cut at the same positions can be assembled not by the rotation as in the conventional manner but by only the parallel movement (shifting) in the maximum eccentric direction.

For example, when the number of the externally toothed gears is two, the externally toothed gears can be assembled by only separating them from each other in the direction of 180° without any rotation when the number is three, they can be assembled by only separating them from each other in the direction of 120° without any rotation.

The assembling using a technique of this parallel movement is advantageous in perfectly performing the simultaneous machining for a plurality of externally toothed gears.

Namely, conventionally, in the internally meshing planetary gears structure of this type, the teeth number difference between the internal gear and each externally toothed gear is often set to be one (1), irrespective of the number of the externally toothed gears. However, if the teeth number difference is set to be one, the positional relationship between the maximum eccentric direction and the external teeth portion in each externally toothed gear is made different for each externally toothed gear. Accordingly, in the externally toothed gears, respective external teeth portions and respective holes passing through the externally toothed gears cannot be simultaneously machined at one time.

Namely, after only the externally toothed gears are simultaneously machined, the phase of each externally toothed gear is shifted (rotated).by a specified amount (half tooth), after which the holes passing through the externally toothed gears are machined. This increases the machining processes, and also remarkably degrades the machining accuracy.

Further, in the actual design, for the convenience thereof, it often happens that the above eccentric body shaft bearing holes and the eccentric body bearing holes cannot be set at the same diameter. Thus, the diameters of the eccentric body bearing holes respectively formed on the externally toothed gears are often made larger or smaller than any one of the diameters of the eccentric body shaft bearing holes respectively formed on the first and second supporting blocks (the necessary condition in the first to third aspects of the present invention).

The above necessary condition includes the case ① that since the bearings are different in material and construction from each other, the diameters of the bearing holes cannot be identical to each other in terms of strength; the case ② that since the bolt holes exist, the strengths near the portions thereof are different from those of the other portions, or the case ③ that since the specified member (e.g. carrier pin) needs to be inserted, the hole through which the carrier pin is first inserted must be larger than that through which the carrier pin is later inserted. In such a case, the above bearing holes cannot be simultaneously machined from one side. Also, there cannot be used the above technique disclosed in Japanese Patent Laid-open No. sho 63-22289.

The present inventors have synthetically examined the above points, and have obtained the following result. Namely, the diameters of the eccentric body shaft bearing holes, the eccentric body bearing holes, and the carrier pin holding holes are respectively set to satisfy such a condition that, when the first and second supporting blocks and the externally toothed gears are appropriately rearranged at the axial positions, the diameters of the eccentric body shaft bearing holes respectively formed on the first and second supporting blocks and the diameters of the eccentric body bearing holes respectively formed on the externally toothed gears become smaller in one direction; and simultaneously, the diameters of the carrier pin holding holes respectively formed on the first and second supporting blocks become smaller in the same direction. Consequently, it is possible to simultaneously machine the eccentric body shaft bearing holes respectively formed on the first and second supporting blocks and the eccentric body bearing holes respectively formed on the externally toothed gears, and also to simultaneously machine the carrier pin holding holes respectively formed on the first and second supporting holes. In the first to third aspects (claims 1 to 3); and in the fourth to sixth aspects (claims 4 to 6) of the present invention, the same effect can be obtained.

Accordingly, it is possible to remarkably enhance the relative positional accuracy among the eccentric body shaft bearing holes, the eccentric body bearing holes, the carrier pin holding holes and respective external teeth portions. This makes it possible to extremely suppress the influence of the relative positional errors due to the machining even with the conventional machine, and hence to extremely enhance the accuracy after assembling.

Also, in the above, the carrier pin holding holes can be simultaneously machined while keeping the same setting as being used in machining the bearing holes. Accordingly, by fixing both the supporting blocks to each other with the carrier pins respectively inserted into the carrier pin holding holes, both the supporting blocks are accurately positioned, thereby improving the positional accuracy of the bearing holes. Consequently, it is possible to improve the repeatability of the positioning when the carrier pins are disassembled and reassembled, without providing the another positioning means.

Also, since both the supporting blocks are fixed to each other by the carrier pins separated therefrom, it is possible to perform the overlapping machining for both the supporting blocks and respective external teeth portions in the state that they are closely contacted with each other. This makes it possible to enhance the perpendicularity of each hole with respect to the face thereof, and hence to improve the accuracy in the axial deflection direction.

In addition, each hole is occasionally formed with, for example, a counterbore portion, or chamferred. However, these portions do not requir the high accuracy, accordingly can be machined separately. Therefore, the diameter of the above additional portions is not necessarily required for the above order.

In the fourth to sixth aspects (claims 4 to 6) of the present invention, as described above, the relationship among the number of the externally toothed gears, the teeth number of the externally toothed gears and the teeth number difference between the internal gear and each externally toothed gear are specified, and the outside diameters of the first and second supporting blocks are set to be smaller than the root diameters of respective external teeth portions of the externally toothed gears. Accordingly, it is possible to further simultaneously machine respective external teeth of the externally toothed gears with the above-described setting (with the same chucking).

As a result, it is possible to simultaneously machine the eccentric body shaft bearing holes respectively formed on the first and second supporting blocks, the eccentric body bearing holes respectively formed on the externally toothed gears, and the carrier pin holding holes respectively formed on the first and second supporting blocks, and to further simultaneously machine respective external teeth of the externally toothed gears. This makes it possible to extremely improve the relative positional accuracy thereof.

In addition, the first to third aspects (claims 1 to 3) of the present invention are made in mainly aiming at the case that the eccentric body bearing holes are respectively formed on the externally toothed gears in such a manner as to be larger or smaller than any one of the eccentric body shaft bearing holes respectively formed on the first and second supporting blocks (that is, different in diameter) owing to some circumstances.

Accordingly, a plurality of the externally toothed gears are not necessarily required. Also, when the first and second supporting blocks are rearranged in the axial positions, the above relationship includes the case that the diameters of respective holes are partially identical to each other; but does not include the case that they are all identical to each other.

Meanwhile, the third to fifth aspects (claims 3 to 5) of the present invention is made in mainly aiming at cutting respective external teeth of a plurality of externally toothed gears, in addition to the formation of each hole, with the same chucking.

Accordingly, a plurality of the externally toothed gears are essentially required. Also, when the first and second supporting blocks are rearranged in the axial positions, the above relationship includes the case that the holes are all identical to each other.

BRIEF DESCRIPTION OF THE DRAWINGS

The above and other objects, features and advantages of the present invention will be more apparent from the following description of the invention taken in conjunction with the accompanying drawings, wherein like reference characters designate the same or similar parts, and wherein.

DESCRIPTION OF THE PREFERRED EMBODIMENT

Hereinafter, one embodiment of the present invention will be described in detail with reference to the accompanying drawings.

Figure 1:
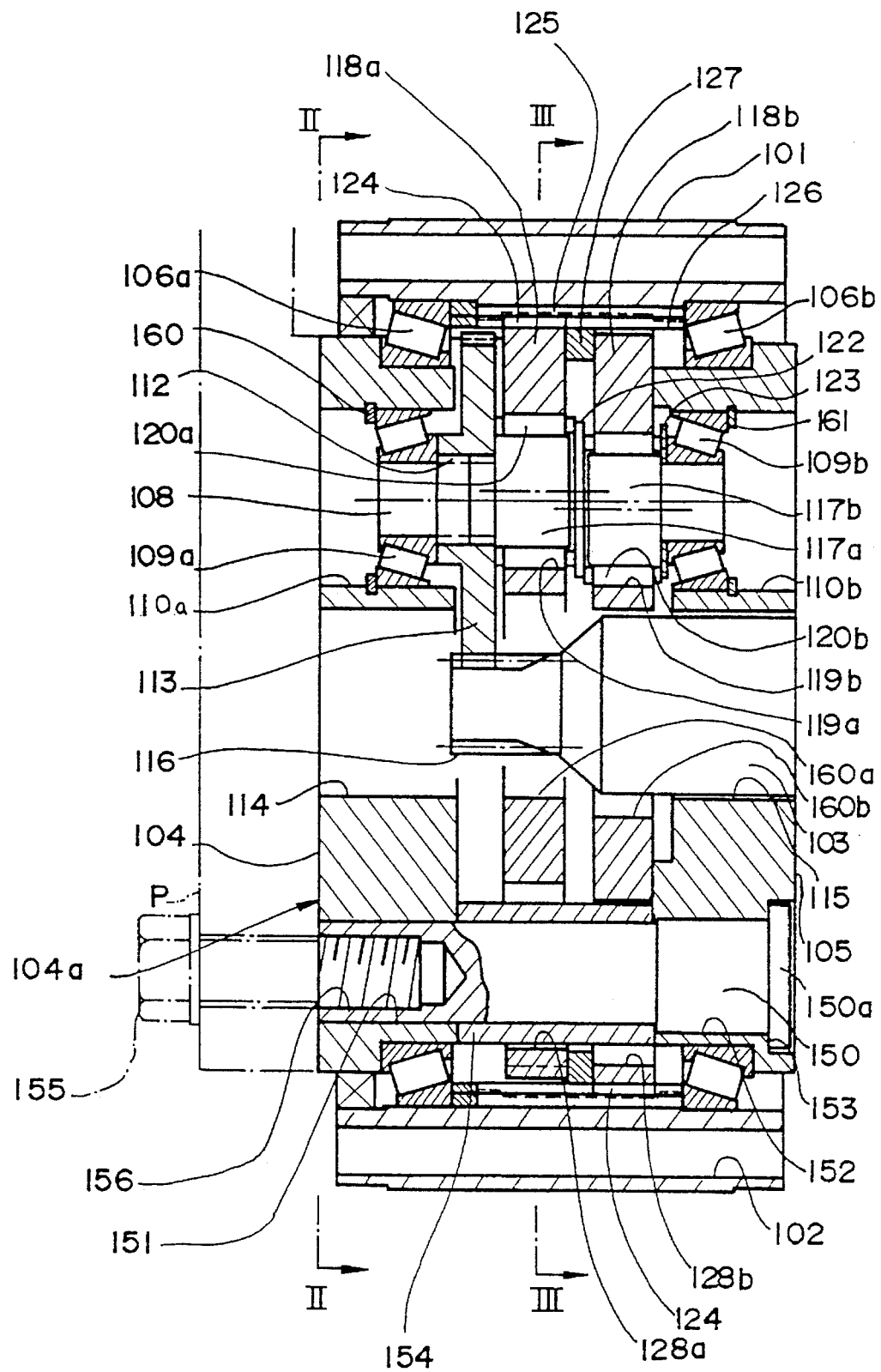
FIG. 1 is a sectional side view of an internally meshing planetary gear structure according to one embodiment of the present invention.

Referring to FIG. 1, numeral 101 indicates a cylindrical casing. The casing 101 has a plurality of bolt insertion holes 102 axially passing through the cylinder wall thereof. The tip of an input shaft (main rotational shaft) 103 rotated by a motor (not shown) is inserted to the central portion of the casing 101 from the right side in the figure.

In the casing 101, a first supporting block (on the left side in the figure) 104 and a second supporting block 105 (on the right side in the figure), which are respectively formed thick disk shapes, are oppositely disposed in an axially spaced apart manner. The outer end surface (left end surface) of the first supporting block 104 slightly projects from the casing 104 for serving as a counter-member mounting surface 104a. These first and second supporting members 104 and 105 are supported by bearings 106a and 106b rotatably around the inner periphery of the casing 101, respectively.

Both the supporting blocks 104 and 105 are rigidly connected to be integrated with each other by three carrier pins 150 disposed in parallel to the input shaft 103, thus constituting a carrier as a whole. The carrier pins 150 are disposed near the outer periphery of each of the supporting blocks 104 and 105 in such a manner as to be circumferentially spaced at equal intervals on the circumference coaxial to the input shaft 101 (see FIGS. 2 and 3).

Carrier pin holding holes 151 and 152 for inserting each carrier pin 150 are formed on the first and second supporting blocks 104 and 105, respectively. Each of the carrier pin holding holes 152 of the second supporting block 105 has a counterbore portion 153 on the outer end surface side. The carrier pin 150 having a flange portion 150a at its head is inserted from the side of the carrier pin holding hole 152 of the second supporting block 105. Thus, by bringing the flange portion 150a thereof in contact with the bottom surface of the counterbore portion 153, the carrier pin 150 is axially positioned with respect to the second supporting block 105.

Also, pipe-like carrier spacers 154 are disposed between the first and second supporting blocks 104 and 105. The tip of each carrier pin 150 passes through each carrier spacer 154 and is inserted in each carrier pin holding hole 151 of the first supporting block 104. The carrier spacer 154 is freely fitted around the outer periphery at the axial intermediate portion of the carrier pin 150. Both end surfaces of each carrier spacer 154 are closely contacted with the first and second supporting blocks 104 and 105, respectively. Consequently, the interval between both the supporting blocks 104 and 105 are kept constant.

The tip surface of each carrier pin 150 is exposed or the counter-member mounting surface 104a of the first supporting block 104. At the center of this exposed tip surface, a screw hole 156 to which each counter-member fixing bolt 155 is screwed. The bolt 155 passing through the bolt insertion hole of the counter-member P is screwed in the screw hole 156. Thus, the counter-member P is connected to the carrier pins 150, and therefore, the first and second supporting blocks 104 and 105 are rigidly connected to each other through the carrier spacers 154 simultaneously.

Figure 2:
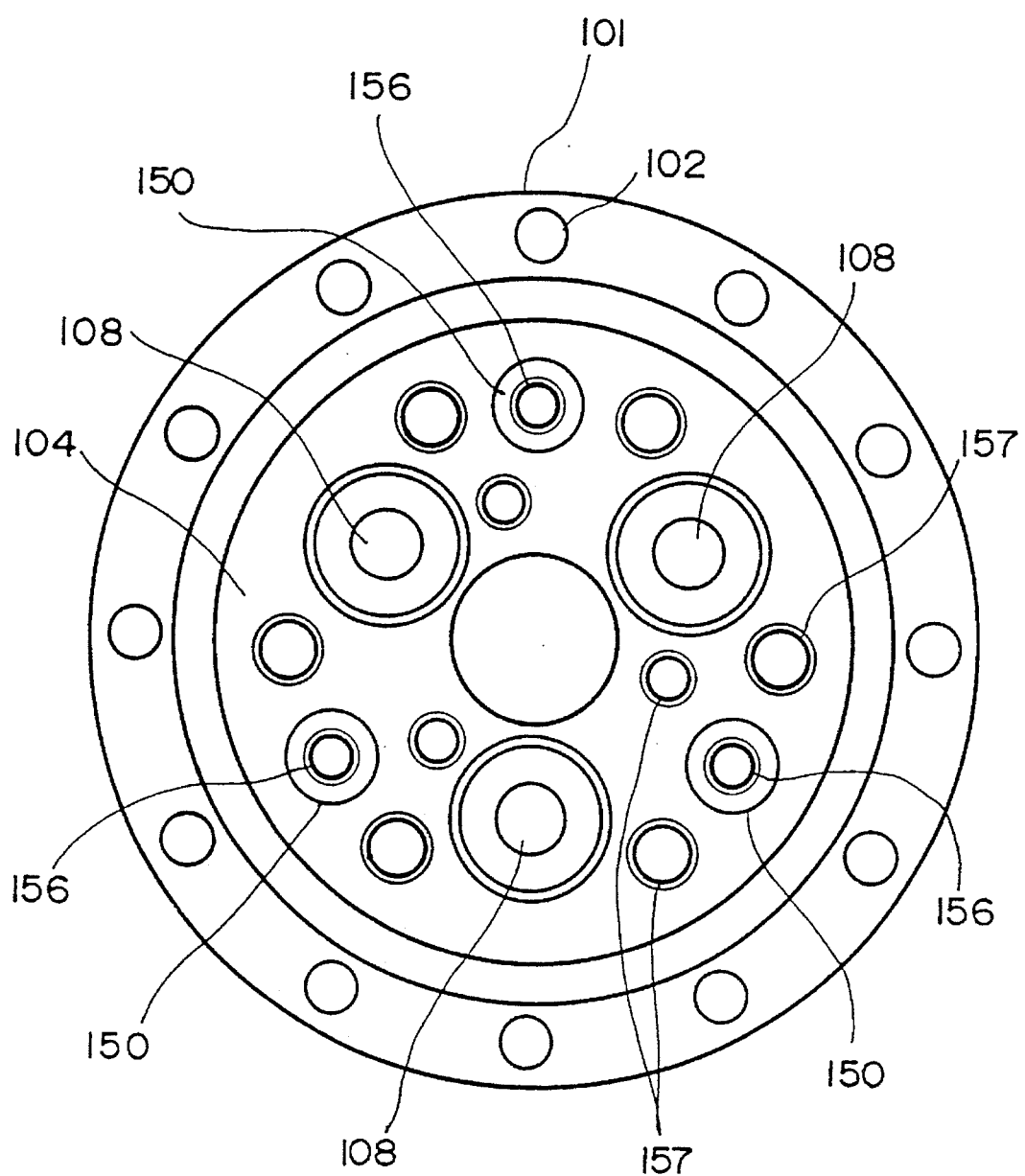
FIG. 2 is a view taken on the line II—II of FIG. 1.
Figure 3:
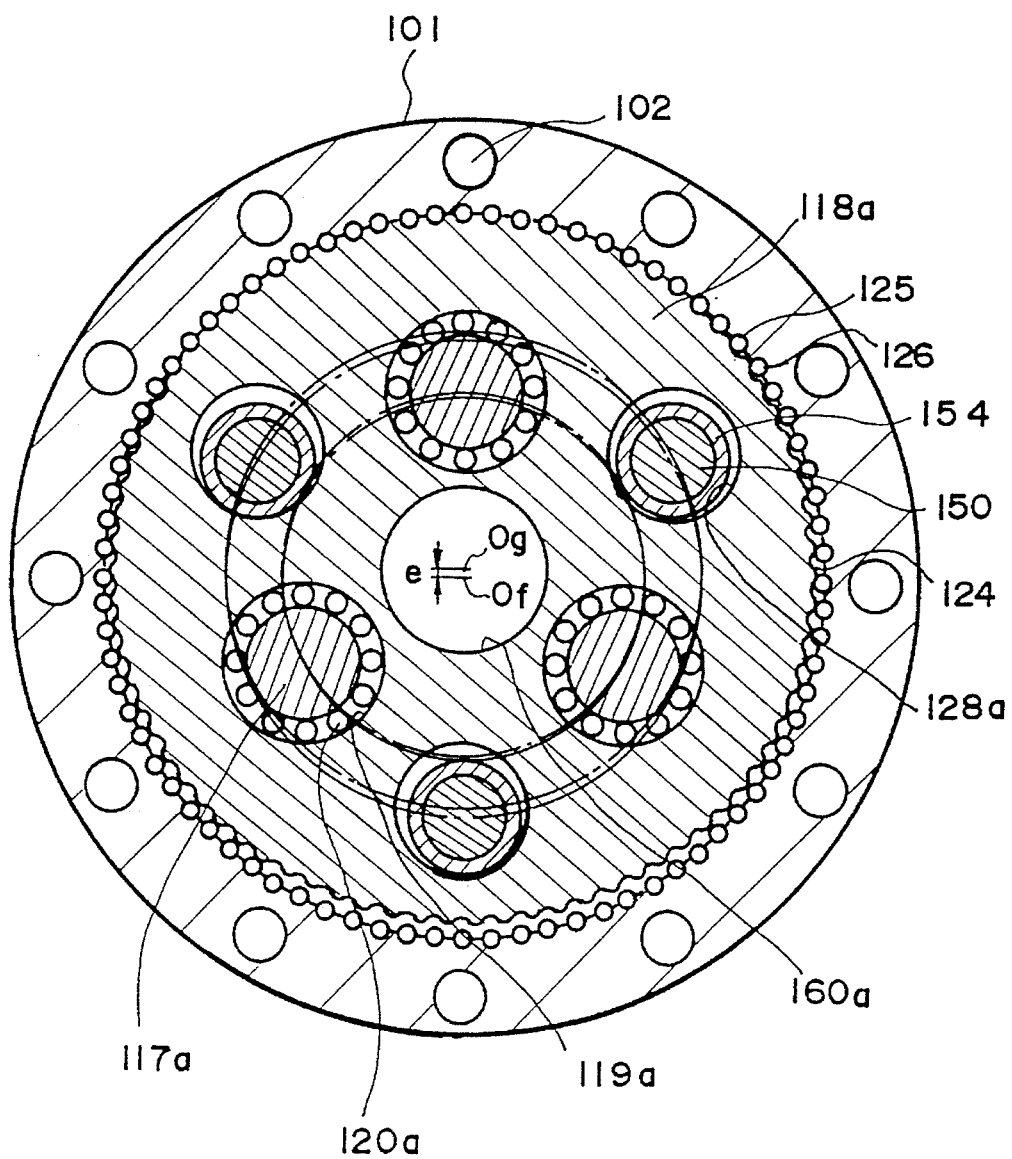
FIG. 3 is a sectional view taken along the line III—III of FIG. 1.

Also, in the casing 1, three eccentric body shafts 108 are disposed in parallel to the input shaft 103. These eccentric body shafts 108 are circumferentially disposed along a circumference coaxial to the input shaft 3 in an equally spaced apart manner. Also, as shown in FIGS. 2 and 3, the eccentric body shafts 108 are positioned on the intermediate portions among the carrier pins 150, respectively. Both the end portions of each eccentric body shaft 108 are rotatably supported by eccentric body shaft bearing holes 110a and 110b of the first and second supporting blocks 104 and 105 through eccentric body bearings (needle bearings) 109a and 109b.

Around each eccentric body shaft 108 on the first supporting block 104 side, a transmission gear 113 is mounted through a spline 112 at the position close to the axial intermediate portion from the portion supported by the above eccentric body shaft bearing 109a.

Center holes 114 and 115 are formed on the first and second supporting blocks 104 and 105 at the radial centers thereof, respectively. The above input shaft 103 is inserted in the center holes 114 and 115 from the side of the second supporting block 105.

The tip of the input shaft 103 is positioned to be inserted slightly within the center hole 114 of the first supporting block 104. A pinion 116 meshing with transmission gears 113 respectively fixed on the above eccentric body shafts 108 is fixed on the tip of the input shaft 103. Accordingly, the rotation of the input shaft 103 is equally distributed to three eccentric body shafts 108 through the pinion 116 and the transmission gears 113. In this case, the teeth number of each transmission gear 113 is larger than that of the pinion 116. Thus, each eccentric body shaft 108 is rotated while being reduced according to the gear ratio between the transmission gear 113 and the pinion 116.

Two eccentric bodies 117a and 117b are axially lined up at the axially central portion of each eccentric body shaft 108. These eccentric bodies 117a and 117b are phase-shifted to each other at 180 degrees.

On the other hand, two disk-like externally toothed gears 118a and 118b, each having an outside diameter smaller than the inside diameter of the casing 101, are axially lined up between the first and second supporting blocks 104 and 105. Three eccentric body bearing holes 119a and 119b, through which the above eccentric body shafts 108 pass respectively, are provided on each of the externally toothed gears 118a and 118b. The above eccentric bodies 117a and 117b are fitted to the eccentric body bearing hole 119a and 119b through the eccentric body bearings 120a and 120b, respectively. With this arrangement, as shown in FIG. 3, the externally toothed gears 118a and 118b are supported in the state where the center Og thereof is eccentric to the rotational center Of of the input shaft 103 by a distance <e>. Thus, the externally toothed gears 118a and 118b are rotated in a rolling (swaying) manner by one rotation around the center Of of the input shaft 103 for each rotation of the eccentric body shafts 108.

The externally toothed gears 118a and 118b are thus disposed. Consequently, between both the supporting blocks 104 and 105, the transmission gears 113, and the externally toothed gears 118a, and the externally toothed gear 118b are adjacently lined up in this order from the first supporting block 104 side to the second supporting block 105 side.

The eccentric body shaft bearing 109a for supporting the eccentric body shaft 108 on the left side in FIG. 1 and the transmission gear 113 are put between the end surface of the eccentric body 117a on the left side and a stopper ring 160 engaging with the inner periphery of the eccentric body shaft bearing hole 110a of the first supporting block 104. Thus, the eccentric body shaft bearing 109a and the transmission gear 113 are positioned on the eccentric body shaft 108.

Also, needle bearings are here used as the above eccentric body shaft bearings 120a and 120b. The axial positioning of the eccentric body shaft bearings 120a and 120b is carried out in the following:

Namely, as shown in FIG. 1, in the eccentric body bearing 120a on the left end side near the first supporting block 104, the left end side thereof is directly positioned by the side surface of the above transmission gear 113, and the right end side thereof is positioned by the flange 122 provided between both the eccentric bodies 117a and 117b. Also, in the eccentric body bearing 120b near the second supporting block 105, the left end side thereof is positioned by the above flange 122 provided between both the eccentric bodies 117a and 117b, and the right end side thereof is positioned by the stopper plate 123.

The stopper plate 123 is pressed by the eccentric body shaft bearing 109 for supporting the eccentric body 108. The eccentric body shaft bearing 109a is pressed by the stopper ring 161 engaging with the inner periphery of the eccentric body shaft bearing hole 110a of the second supporting block 105.

Each of the externally toothed gears 118a and 118b has the external teeth portion formed in a circular arc or trochoid shape. The internal gear 125 meshing with the externally toothed gears 118a and 118b is disposed on the outer peripheral side of the externally toothed gears 118a and 118b. The internal gear 125 is formed integrally with the casing 101 around the inner periphery thereof. The internal gear 125 has internal teeth constituted of outer pins. In addition, the outer pins 126 are pressed by a pin-pressing ring 127 from the inside for preventing them from slipping off.

The center holes 16a and 160b, through which the input shaft 103 passes, are formed at the centers of the external gears 118a and 118b, respectively. Also, the inserting-fit holes 128a and 128b are formed at the positions corresponding to each carrier pin 150 in the external gears 118a and 118b. The carrier pin 150 and the carrier spacer 154 pass through the inserting-fit holes 128a and 128b.

The carrier pins 150 are intended to transmit the rotational force applied to the second supporting block 105 to the first supporting block 104. Each of the inserting-fit holes 128a and 128b of the externally toothed gears 118a and 118b is formed in a circular shape having a size enough to prevent the interference with the carrier pin 150 and the carrier spacer 154 even on rolling of the externally toothed gears 118a and 118b.

Also, as shown in FIG. 2, on the counter-member mounting surface of the first supporting block 104, a plurality of counter-member fixing screw holes 157 are formed, in addition to the screw holes 156 on the tip surface of the carrier pin 150. By screwing the fixing bolts 155 to a plurality of the screw holes 156 and 157, the counter-member is forcibly connected.

Next, the function of the gear structure of the present invention will be described below.

In the same manner as described in the conventional structures, the externally toothed gears 118a and 118b are rotated in a rolling (swaying) manner together with the rotation of the input shaft 103. At the same time, the external pins 126 equivalent to the internal teeth of the internal gear 125 mesh with the externally toothed gears 118a and 118b. Thus, the rotation of the input shaft 103 becomes the reduced rotation of the externally toothed gears 118a and 118b.

The rotations of the externally toothed gears 118a and 118b are transmitted to the first and second supporting blocks 104 and 105 through three eccentric body shafts 108. The rotational force applied to the second supporting block 105 is transmitted to the first supporting block 104 through the carrier pins 150. The rotational force thereof is transmitted from the first supporting block 104 to the counter-member P connected thereto.

Now, the construction for improving the accuracy will be described below.

First, there will be described the construction for simultaneous machining the eccentric body shaft bearing holes 110a and 110b, the eccentric body bearing holes 119a and 119b, and the carrier holding holes 151 and 152.

In the above, particularly, in the eccentric body shaft bearing holes 110a and 110b respectively formed on the first and second supporting blocks 104 and 105, and the eccentric body bearing holes 119a and 119b respectively formed on the externally toothed gears 118a and 118b, it becomes important to keep the machining accuracy including the relative positional relationship thereof at the higher level for improving the accuracy, performance and quality of the assembly.

The same is true for the carrier pin holding holes 151 and 152.

Further, the carrier pin holding holes 151 and 152 are required for the high accuracy in the respective positions to the eccentric body shaft bearing holes 110a and 110b, and the eccentric body bearing holes 119a and 119b. Accordingly, if all of the members are machined under the same chucking, it is possible to extremely improve the accuracies thereof.

In addition, as described above, the carrier pin inserting-fit holes 128a and 128b are not required for the high accuracies. The same is true for the counterbore portion 153. Accordingly, they may be separately machined without no problem, and are thus out of the regulation of the diameter relationship according to the present invention.

In the structure of this embodiment, the holes requiring the high accuracies as described above are constructed in the following.

Namely, the eccentric body shaft bearing holes 110a and 110b respectively formed on the first and second supporting blocks 104 and 105, the eccentric body bearing holes 119a and 119b respectively formed on the externally toothed gears 118a and 118b and the carrier pin holding holes 151 and 152 are all made to be through-holes for making possible the simultaneous machining.

Next, among these holes, the eccentric body shaft bearing holes 110a and 110b on both the supporting blocks 104 and 105 and the eccentric body bearing holes 119a and 119b on the externally toothed gears 118a and 118b are disposed on the same circumference at the same pitch. Also, the carrier pin holding holes 151 and 152 on the first and second supporting blocks 104 and 105 are disposed on the same circumference at the same pitch.

Further, assuming that the diameters of the eccentric body shaft bearing holes 110a and 110b respectively formed on the first and second supporting blocks 104 and 105 are D1 and D2, and the diameters of the eccentric body bearing holes 119a and 119b respectively formed on the externally toothed gears 118a and 118b are D3 and D4, the diameters are specified by the following relation.

$$D2=D1>D3=D4 \quad (1)$$

Namely, the diameters of the eccentric body bearing holes 119a and 119b on respective sides of the externally toothed gears 118a and 118b are set to be smaller than any one of the diameters of the eccentric body shaft bearing holes 110a and 110b on respective sides of the supporting blocks 104 and 105.

Also, as the carrier body, the carrier pins 150 separated from the first and second supporting blocks 104 and 105 are used. The carrier pins 150 are passed through respective carrier pin holding holes 151 and 152 respectively formed on the first and second supporting blocks 104 and 105 from the second supporting block 105 side. Thus, the first and second supporting blocks 104 and 105 are rigidly connected to each other. Namely, in this structure, the diameter D5 of the carrier pin holding hole 151 on the first supporting block 104 and the diameter D6 of the carrier pin holding hole 152 on the second supporting block 105 are specified by the following relation.

$$D5<D6 \quad (2)$$

This is because the carrier pins 150 are made to easily inserted from one side.

Figure 4:
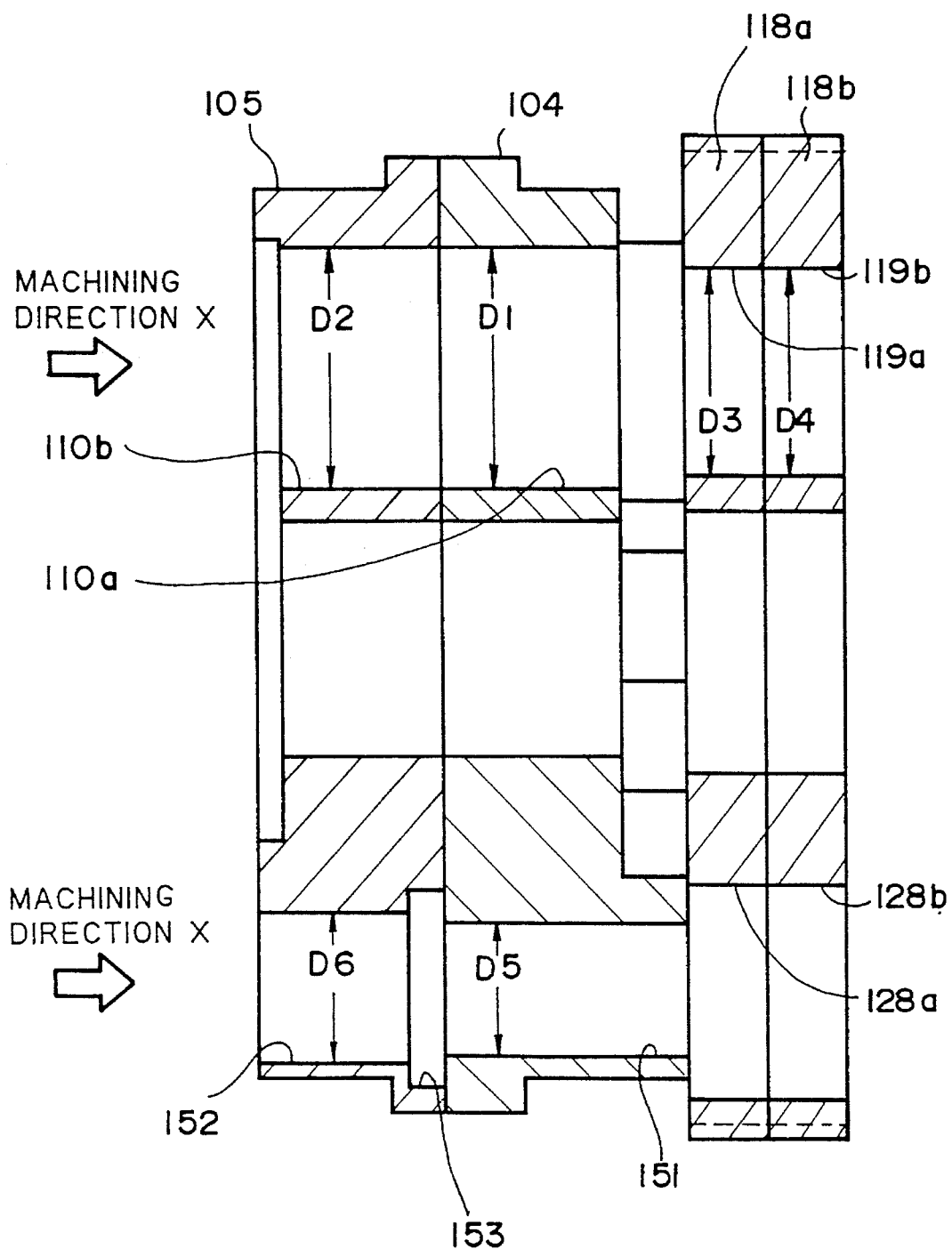
FIG. 4 is an explanatory view explaining the hole machining for parts of the gear structure (first and second supporting blocks and externally toothed gears) according to one embodiment of the present invention.

As explained above, the diameters of respective holes are set to simultaneously satisfy the expressions (1) and (2). Accordingly, as shown in FIG. 4, when the second supporting blocks 105, the first supporting block 104, the externally toothed gears 118a and 118b are set to be overlapped in this order from the right side in the figure, respective holes become smaller in diameter (partially, the diameters being identical to each other) as nearing to the right side in the figure. Namely, the diameters of the eccentric body shaft bearing holes 110a and 110b on respective sides of the first and second supporting blocks 104 and 105, and the diameters of the eccentric body bearing holes 119a and 119b on respective sides of the externally toothed gears 118a and 118b become smaller toward the right side in the figure. Simultaneously, while holding the above (same) arrangement, the diameters of the carrier pin holding holes 151 and 152 become smaller toward the right side in the figure.

Accordingly, by inserting a tool from the left side in the figure (the machining direction is shown as an arrow X), it is possible to simultaneously machine the eccentric body shaft bearing hole 110b on the second supporting block 105, the eccentric body shaft bearing hole 110a on the first supporting block 104, the eccentric body bearing hole 119a on the externally toothed gear 118a, and the eccentric body bearing hole 119b on the externally toothed gear 118b. Also, with the same setting (with the same chucking), it is possible to simultaneously machine the carrier pin holding hole 152 on the second supporting block 105 and the carrier pin holding hole 151 on the first supporting block 104.

Thus, it is possible to remarkably enhance the relative positional accuracy of each hole which is machined by the one setting.

In addition, the above embodiment has showed the case that the bearing holes 110a and 110b on the supporting blocks are larger than the bearing holes 119a and 119b on the externally toothed gears. However, even in the reversed case, the simultaneous machining is possible. At this time, the diameters are specified by the following relations.

$$D1=D2>D3=D4 \quad (3)$$

$$D5<D6 \quad (4)$$

Figure 5:
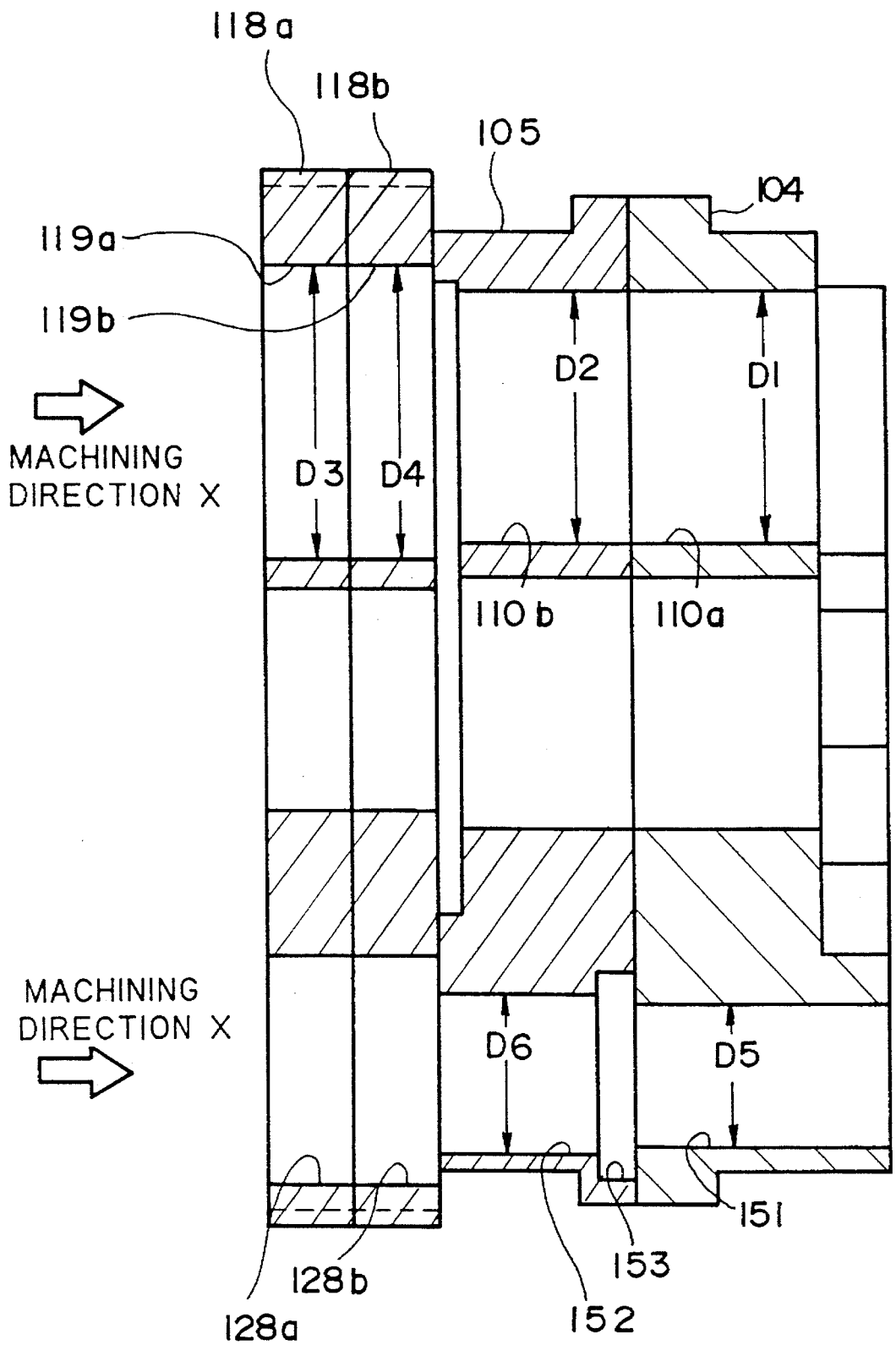
FIG. 5 is an explanatory view explaining the hole machnig for parts of the gear structure (first and second supporting blocks and externally toothed gears) according to another embodiment of the present invention.

Accordingly, as shown in FIG. 5, the externally toothed gears 118a and 118b, the second supporting block 105, and the first supporting block 104 are set to be overlapped in this order from the left side in the figure. Thus, the diameters of respective bearing holes become smaller toward the right side. The diameters of respective carrier hole holding holes 152 and 151 also become smaller toward the right side. Accordingly, by inserting the tool from the left side in the same manner as described above, it is possible to simultaneously machine the above holes.

Next, there will be explained the construction for simultaneously machining respective external teeth portions 124 of the externally toothed gears 118a and 118b with the same setting (with the same chucking). First, prior to the concrete explanation of this embodiment, there will be explained the basic construction for simultaneously machining respective external teeth portions of the external toothed gears according to the present invention.

Figure 9:
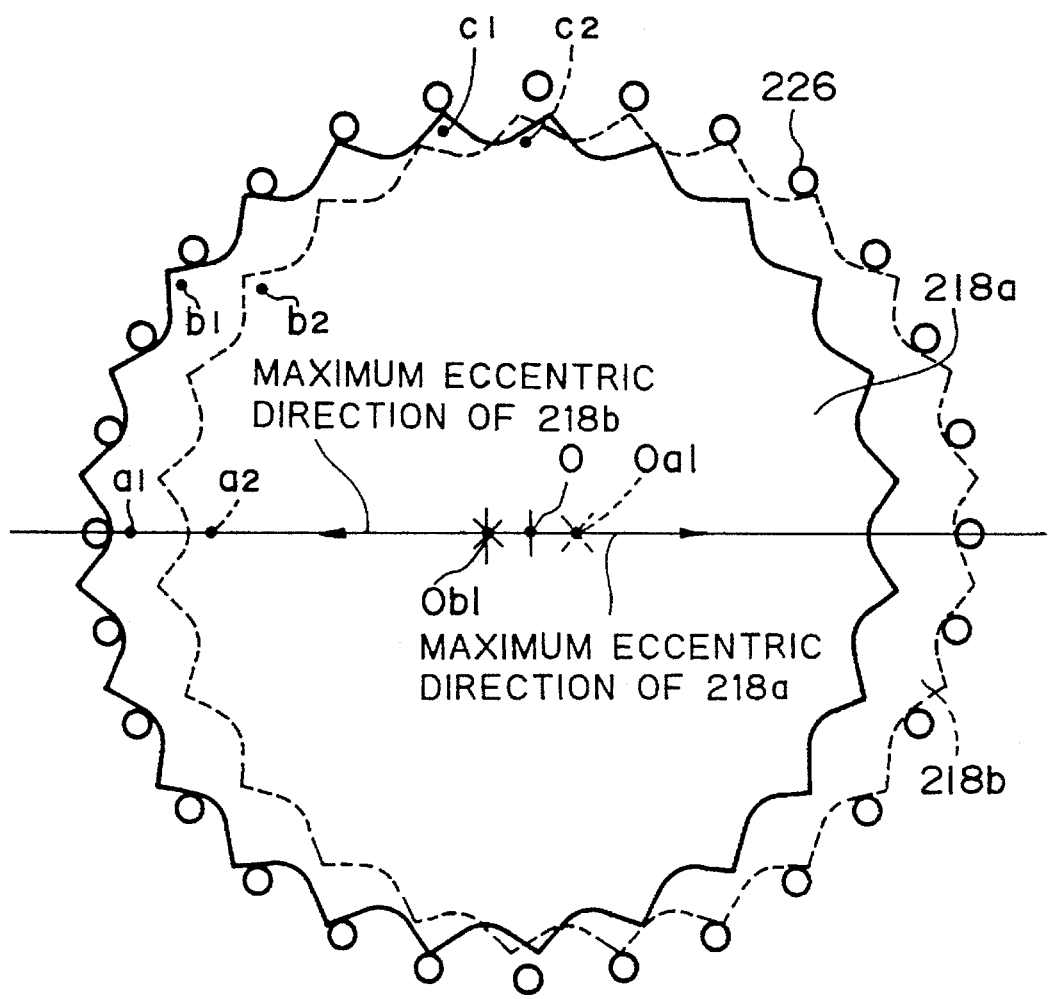
FIG. 9 is an explanatory view explaining a basic principle relating to the teeth number of the externally toothed gears, the number of the externally toothed gears, and the teeth number difference between the internal gear and each externally toothed gear according to the present invention.
Figure 10:
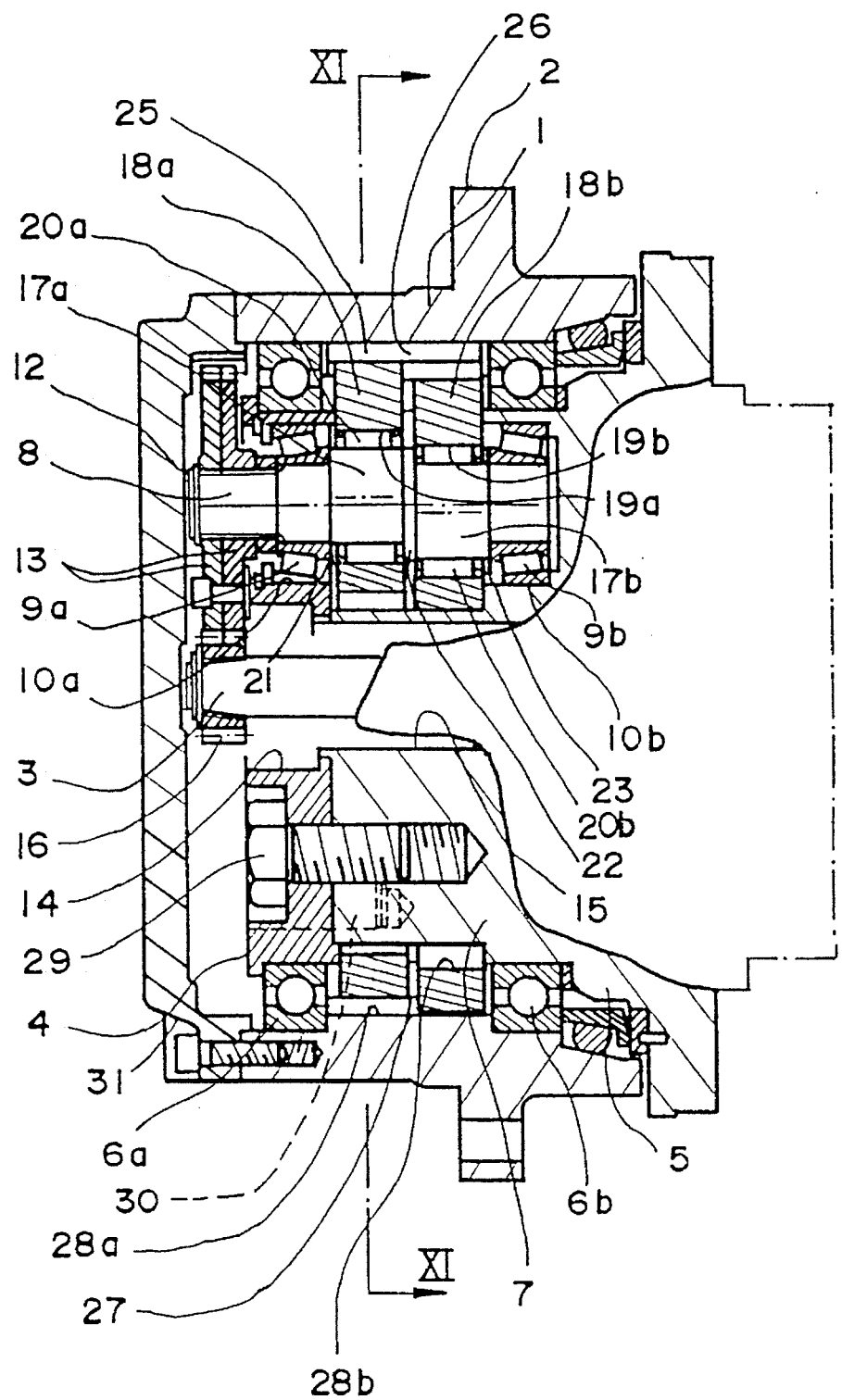
FIG. 10 is a sectional side view showing one example of the conventional internally meshing planetary gear structure.
Figure 11:
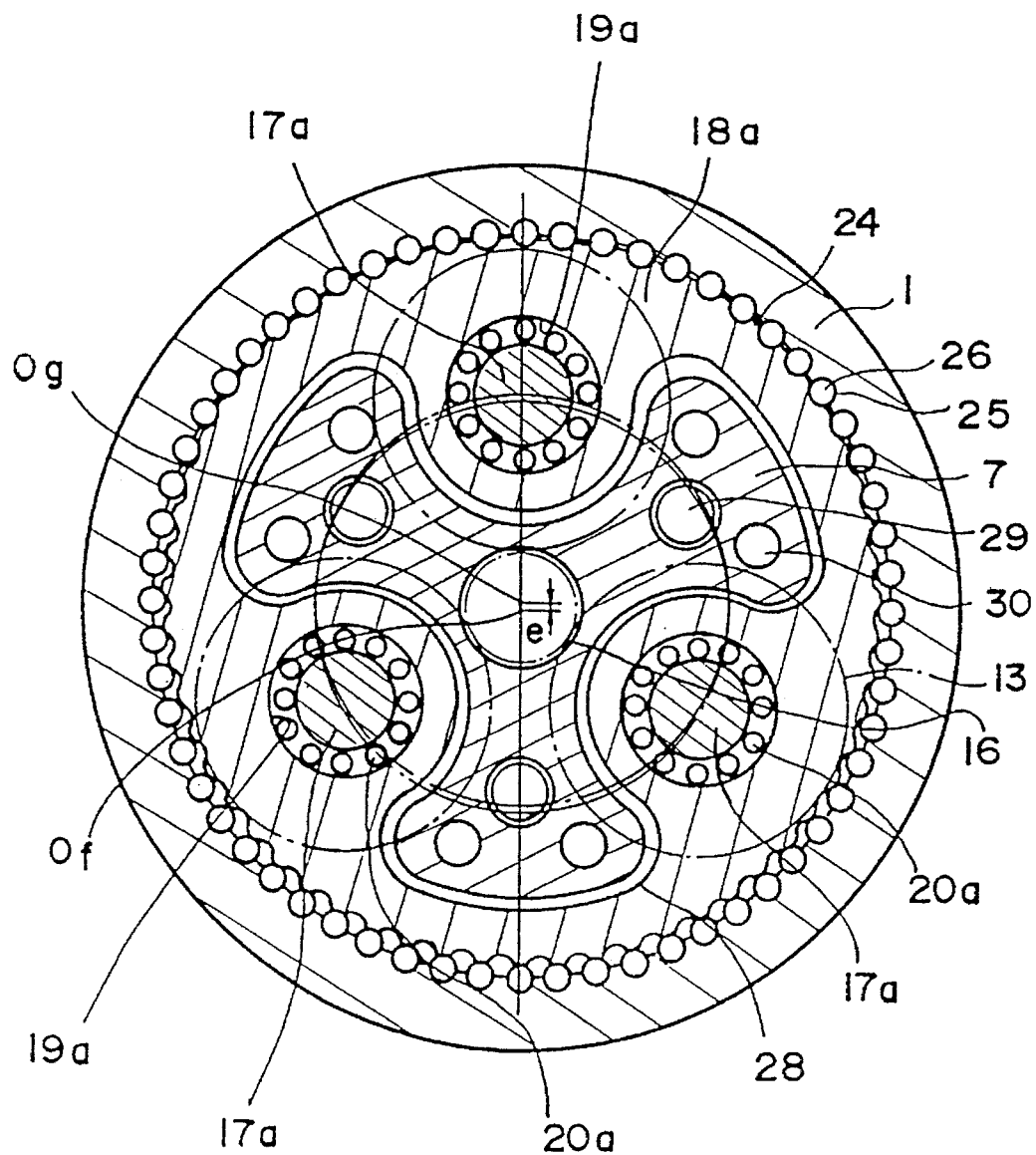
FIG. 11 is a sectional view taken on the line XI—XI of FIG. 10.
Figure 12:
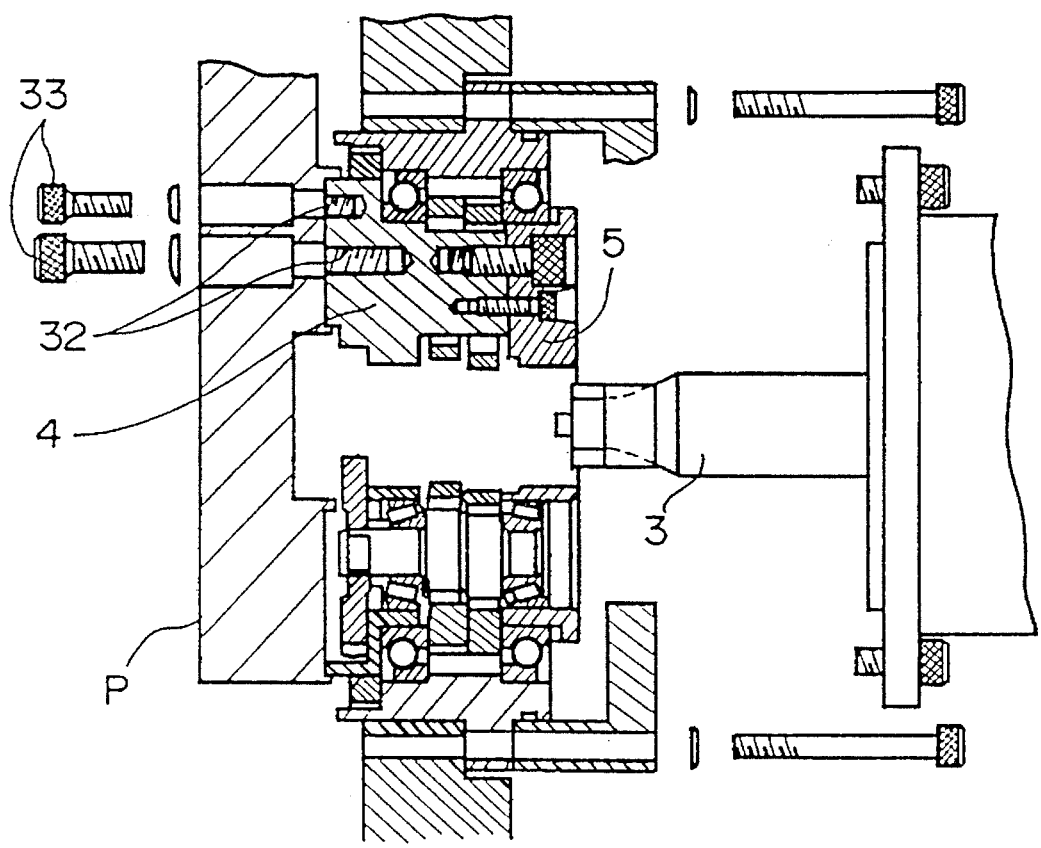
FIG. 12 is a sectional side view showing another example of the conventional internally meshing planetary gear structure.

FIG. 9 shows a relationship between two of the externally toothed gears 218a and 218b and the external pins 226 equivalent to the internal teeth of the internal gear 225.

As shown in FIG. 9, in each of the externally toothed gears 218a and 218b, the teeth number is specified at <24>. This value is the integral magnification of <2> being the number of the externally toothed gears 218a and 218b. Also, the number of the external pins 226 is <28>. Accordingly, the teeth number difference between each of the externally toothed gears 218a and 218b and the external pins 226 is specified to <4>. This is the integral magnification of [2] being the number of the externally toothed gears 218a and 218b.

In addition, the symbol O is the center of the main rotational shaft, $O_{a1}$ is the center of the externally toothed gear 218a moved eccentrically to the maximum eccentric direction, $O_{b1}$ is the center of the externally toothed gear 218b moved eccentrically to the maximum eccentric direction.

As a result of the above setting, when being assembled, the externally toothed gears 218a and 218b are only subjected to the parallel movement in respective maximum eccentric directions (in this case, spaced 180° apart). Thus, even if each through-hole with what shape is formed at what position of the externally toothed gears 218a and 218b, it is possible to machine respective external teeth portions and various holes of the externally toothed gears at one time.

Further, because of the assembly by the parallel movement, respective teeth of the externally toothed gears formed at the same positions (for example, a1 and a2, b1 and b2, and c1 and c2 in the figure) are inevitably prevented from being simultaneously meshed with the internal gear. Accordingly, it is possible to realize one of the basic thoughts of the present invention, that is, to prevent respective external teeth portions cut at the same positions from being simultaneously meshed with the internal gear during operation.

The above relationship among the piece number, teeth number and the teeth number difference is essential for invariably performing the assembling by the parallel movement. When the above relationship is satisfied, the assembly can be invariably performed by the parallel movement. On the contrary, when the above relationship is not satisfied, the assembly is not necessarily performed by the parallel movement.

Also, the assembly by the parallel movement, that is, the assembly of each externally toothed gear without rotation is essential for machining respective external teeth and various holes of the all externally toothed gears at one time, even when each hole with what shape is formed on what position of the externally toothed gears. When the assembly can be performed by the parallel movement, respective external teeth and various holes of the all externally toothed gears can be machined at one time.

However, when the assembly can not performed by the parallel movement, that is, the assembly cannot be performed if one of the externally toothed gears is not rotated with respect to the other externally gear (after machining), respective external teeth portion and various holes of the all externally toothed gears cannot necessarily be machined at one time.

Accordingly, in the present invention, the above relationship among the piece number, teeth number and the teeth number difference in the externally toothed gears is satisfied. Accordingly, it is possible to simultaneously machine the eccentric body shaft bearing holes 110a and 110b, the eccentric body bearing holes 119a and 119b respectively formed on the externally toothed gears, and the carrier pin holding holes 151 and 152 respectively formed on the first and second supporting blocks 104 and 105 in associated with the above-described construction. Further, it is possible to simultaneously machine respective external teeth of the externally toothed gears 118a and 118b.

As is apparent from the figure, in this embodiment, the number of the externally toothed gears 118a and 118b is set to <2>. Also, the teeth number of the externally toothed gears 118a and 118b are set to be <78>. This is the integral magnification of 2 being the number of the externally toothed gears 118a and 118b. Further, the number of the external pins 125 (equivalent to the teeth number of the internal gear 125) is set to be <80>, and thus the teeth number difference between the external toothed gears 118a and 118b and the same becomes <2>. Namely, the teeth number difference is set to the integral magnification of <2> being the number of the externally toothed gears. As a result, when being assembled, the externally toothed gears 118a and 118b are only subjected to the parallel movement in the maximum eccentric direction of 180°.

Figure 6:
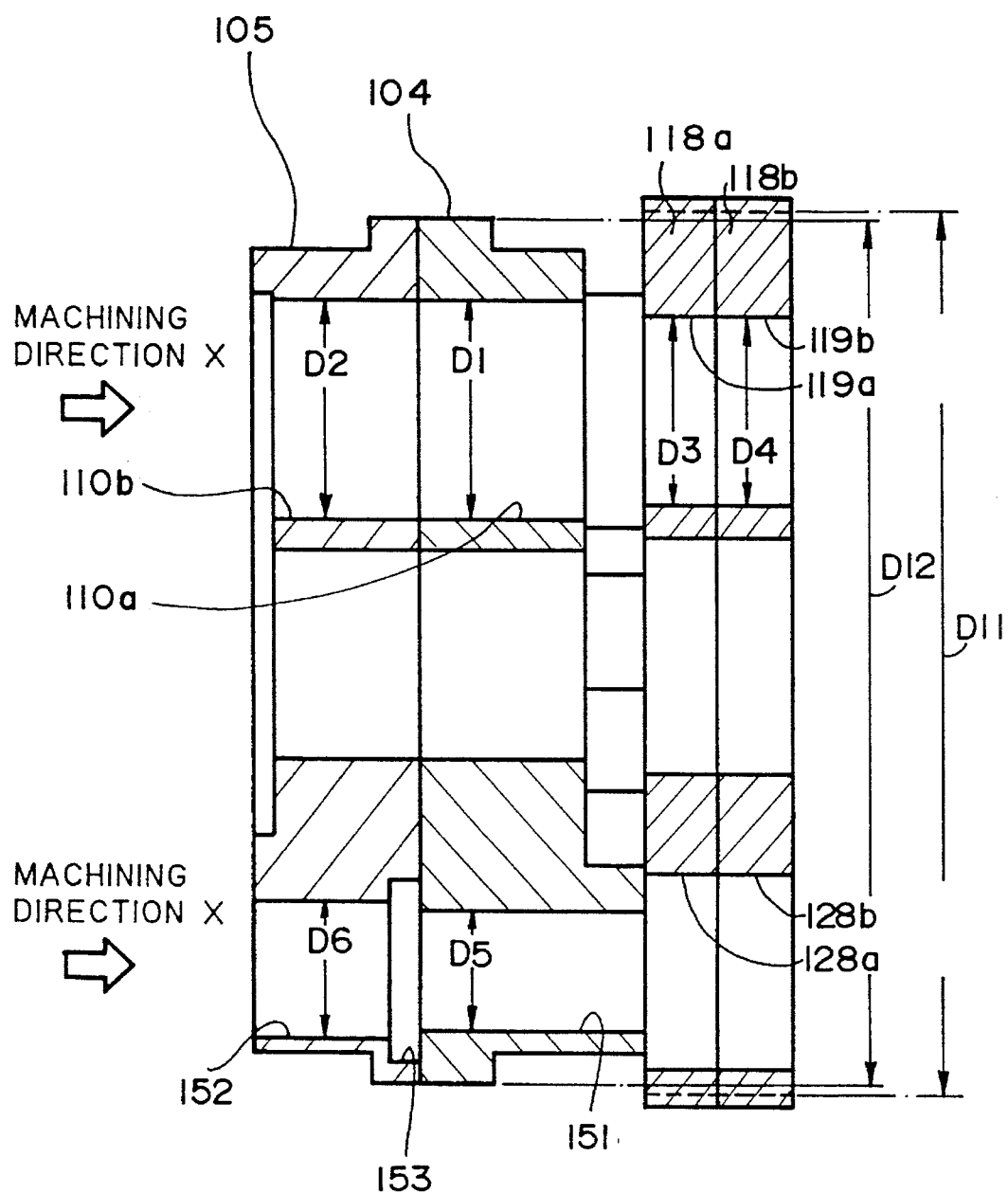
FIG. 6 is a sectional view equivalent to FIG. 4 in aiming at the root diameters of respective external teeth of the externally toothed gears and the outside diameters of the first and second supporting blocks.
Figure 7:
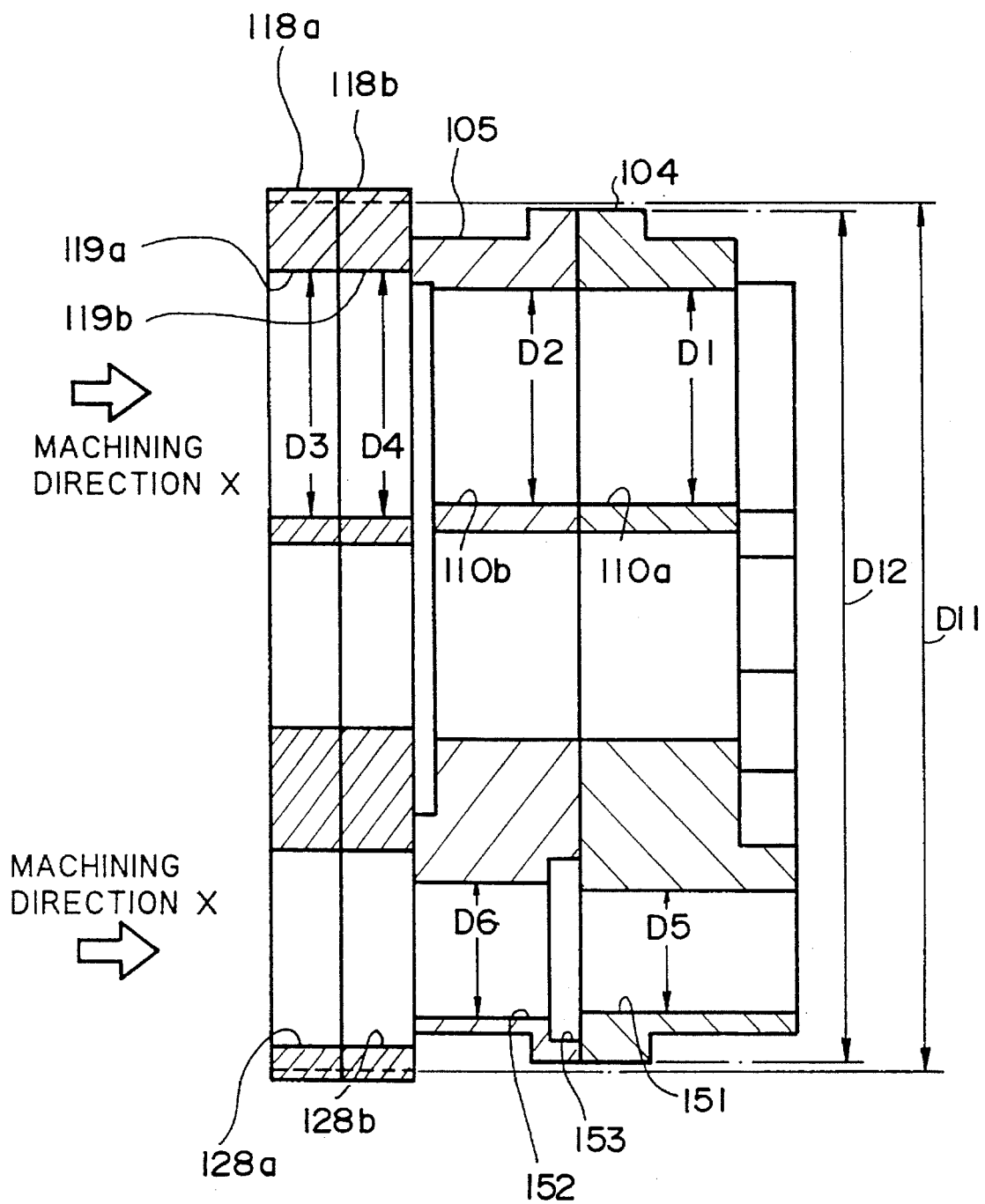
FIG. 7 is a sectional view equivalent to FIG. 5 in aiming at the root diameters of respective external teeth of the externally toothed gears and the outside diameters of the first and second supporting blocks.

As a result, respective external teeth portions cut at the same positions are not necessarily meshed with the external pins 126 simultaneously, thus realizing the thought of the present invention. Also, while various holes are formed on the externally toothed gears 118a and 118b, even if each hole having what shape is formed at what position, respective external teeth and the various holes of the externally toothed gears 118a and 118b can be simultaneously machined at one time in the state where the externally toothed gears 118a and 118b are overlapped to each other. Accordingly, as is apparent from FIGS. 6 and 7, by setting the root diameter D11 of each external teeth 125 of the externally toothed gears 118a and 118b to be smaller than the outside diameter D12 of the first and second supporting blocks 104 and 105, it is possible to simultaneously machine the eccentric body shaft bearing holes 110a and 110b, the eccentric body bearing holes 119a and 119b and the external pins 151 and 152 with one setting (with the same chucking), and further to simultaneously machine respective external teeth 124 of the externally toothed gears 118a and 118b. As a result, it is possible to machine and assemble these holes while accurately keeping the relative positional relation therebetween. In addition, FIGS. 6 and 7 are substantially equivalent to FIGS. 4 and 5, wherein the condition regarding the root diameter D11 and the outside diameter D12 is satisfied.

Incidentally, in the above embodiment, the carrier pin 150 is made as the flange structure to be inserted from the second supporting block 105 side, and the interval between the first supporting block 104 and the second supporting block 105 is defined by the separate carrier spacer 154. However, the construction shown in FIG. 8 is possible.

Figure 8:
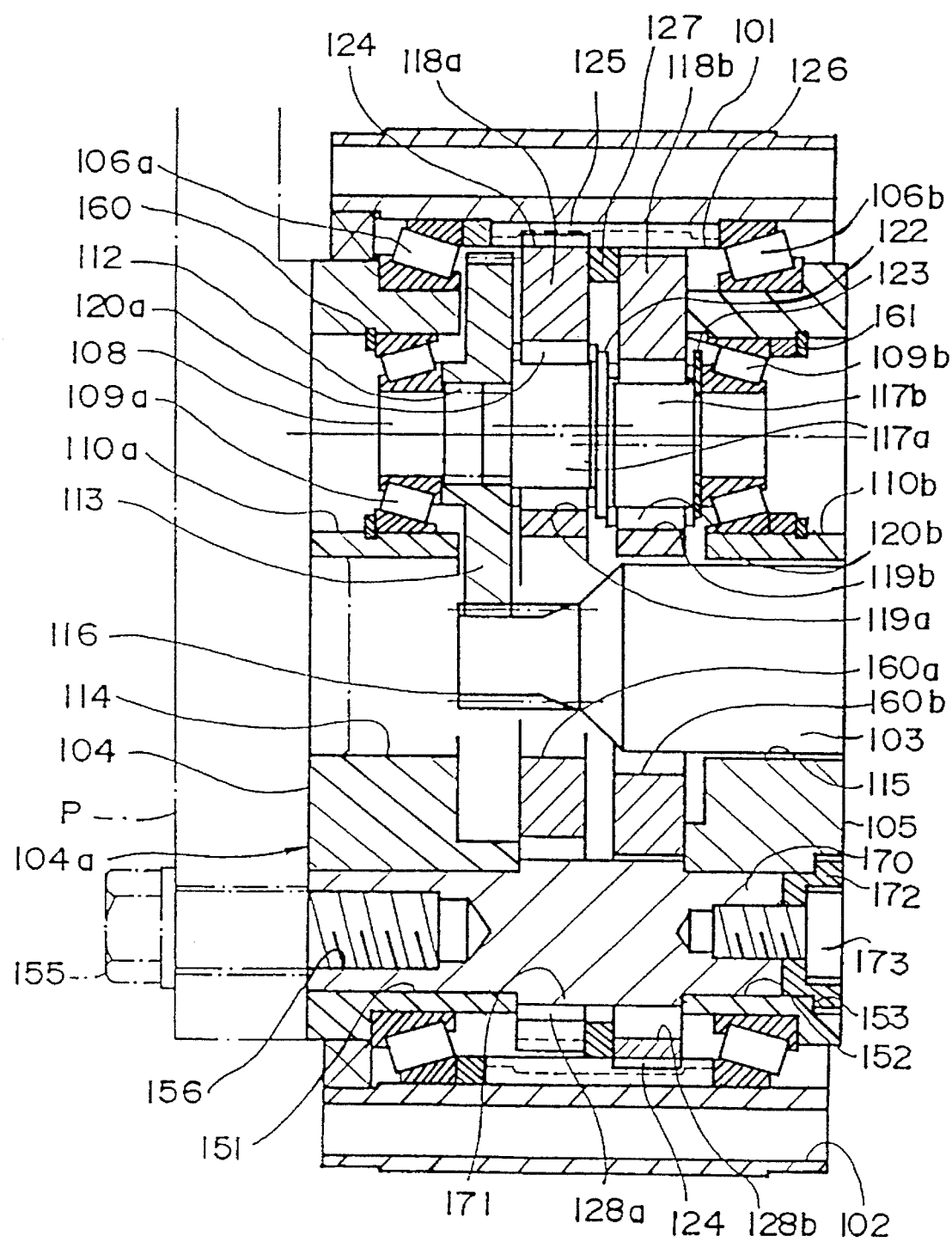
FIG. 8 is a sectional view equivalent to FIG. 1 showing the examples wherein the construction near carrier pins is changed according to the embodiment of the present invention.

In FIG. 8, the carrier pin 170 has a protruding portion 171, which serves as the carrier spacer 154 in the above-described embodiment. The carrier pin 170 is so constructed as to achieve the same function as the flange on the above-described embodiment (the function for preventing the movement of the carrier pin in the left direction in the figure) by an intermediate body 172 and bolts 173.

The other constructions are similar to the above embodiment, and the similar functional effects can be obtained. Accordingly, the same parts are indicates at like reference numerals, and the explanation thereof is omitted.

What is claimed is:

1. In an internally meshing planetary gear structure comprising:

a casing;

a main rotational shaft having a tip thereof inserted into said casing;

a first supporting block and a second supporting block, which are disposed around said main rotational shaft in an axially spaced apart manner, and which are rotatably supported by said casing through respective bearings;

a carrier body which rigidly connects said first supporting block with the second supporting block;

a plurality of eccentric body shafts, which are disposed along a circumference coaxial to said main rotational shaft, and which are rotatably supported at both the ends thereof by eccentric body shaft bearing holes formed on said first and second supporting blocks, and rotated in interlocking relation with said main rotational shaft;

eccentric bodies provided at approximately axially central portions of said eccentric body shafts;

an externally toothed gear, which is provided between said first and second supporting blocks, and which is eccentrically rotated around said main rotational shaft in a rotatable fitting relation between said eccentric body bearing holes formed thereon and said eccentric bodies through said eccentric body bearings; and an internal gear fixed on said casing and internally meshing with said externally toothed gear;

wherein respective diameters of said eccentric body bearing holes are different from any one of the diameters of said eccentric body shaft bearing holes formed on said first and second supporting blocks, the improvement wherein said carrier body comprises carrier pins separately from said first and second supporting blocks; and said first and second supporting blocks are rigidly connected to each other by said carrier pins respectively passing through carrier pin holding holes respectively formed on said first and second supporting blocks from one supporting block side, wherein said eccentric body shaft bearing holes, said eccentric body bearing holes and said carrier pin holding holes are made to be through-holes;

among said holes, said eccentric body shaft bearing holes formed on said first and second supporting blocks, and said eccentric body bearing holes formed on said externally toothed gear are disposed along a same circumference at a same pitch;

said carrier pin holding holes formed on said first and second supporting blocks are disposed along a same circumference at a same pitch;

wherein, respective diameters of said eccentric body shaft bearing holes, said eccentric body bearing holes and said carrier pin holding holes are configured such that when said first and second supporting blocks and said externally toothed gear are appropriately arranged in predetermined axial positions thereof, diameters of said eccentric body shaft bearing holes formed on said first and second supporting blocks and diameters of said eccentric body bearing holes formed on said externally toothed gear are at least a same diameter in a machining direction, such that said diameters can be simultaneously machined; and wherein diameters of said carrier pin holding holes formed on said first and second supporting blocks are at least a same diameter in a machining direction, wherein a diameter of a first hole in the machining direction is not smaller than a diameter of a second hole, said second hole being on a same axis as said first hole, and further along in the machining direction than said first hole.

2. In a transmission comprising:

a casing;

a main rotational shaft having a tip thereof inserted into said casing;

a first supporting block and a second supporting block, which are disposed around said main rotational shaft in an axially spaced apart manner, and which are rotatably supported by said casing through respective bearings;

a carrier body which rigidly connects said first supporting block with the second supporting block;

a plurality of eccentric body shafts, which are disposed along a circumference coaxial to said main rotational shaft, and which are rotatably supported at both the ends thereof by eccentric body shaft bearing holes formed on said first and second supporting blocks, and rotated in interlocking relation with said main rotational shaft;

eccentric bodies provided at approximately axially central portions of said eccentric body shafts;

an externally toothed gear, which is provided between said first and second supporting blocks, and which is eccentrically rotated around said main rotational shaft in a rotatable fitting relation between said eccentric body bearing holes formed thereon and said eccentric bodies through said eccentric body bearings; and an internal gear fixed on said casing and internally meshing with said externally toothed gear;

wherein respective diameters of said eccentric body bearing holes are different from any one of the diameters of said eccentric body shaft bearing holes formed on said first and second supporting blocks, the improvement wherein said carrier body comprises carrier pins separately from said first and second supporting blocks; and said first and second supporting blocks are rigidly connected to each other by said carrier pins respectively passing through carrier pin holding holes respectively formed on said first and second supporting blocks from one supporting block side, wherein said eccentric body shaft bearing holes, said eccentric body bearing holes and said carrier pin holding holes are made to be through-holes;

among said holes, said eccentric body shaft bearing holes formed on said first and second supporting blocks, and said eccentric body bearing holes formed on said externally toothed gear are disposed along a same circumference at a same pitch;

said carrier pin holding holes formed on said first and second supporting blocks are disposed along a same circumference at a same pitch;

wherein respective diameters of said eccentric body shaft bearing holes, said eccentric body bearing holes and said carrier pin holding holes are configured such that when said first and second supporting blocks and said externally toothed gear are appropriately arranged in predetermined axial positions thereof, diameters of said eccentric body shaft bearing holes formed on said first and second supporting blocks and diameters of said eccentric body bearing holes formed on said externally toothed gear are at least a same diameter in a machining direction, such that said diameters can be simultaneously machined; and wherein diameters of said carrier pin holding holes formed on said first and second supporting blocks are at least a same diameter in a machining direction, wherein a diameter of a first hole in the machining direction is not smaller than a diameter of a second hole, said second hole being on a same axis as said first hole, and further along in the machining direction than said first hole.

3. In an internally meshing planetary gear structure comprising:

a casing;

a main rotational shaft having a tip thereof inserted into said casing;

a first supporting block and a second supporting block, which are disposed around said main rotational shaft in an axially spaced apart manner, and which are rotatably supported by said casing through respective bearings;

a carrier body which rigidly connects said first supporting block with the second supporting block;

a plurality of eccentric body shafts, which are disposed along a circumference coaxial to said main rotational shaft, and which are rotatably supported at both ends thereof by eccentric body shaft bearing holes formed on said first and second supporting blocks, and rotated in interlocking relation with said main rotational shaft;

eccentric bodies provided at the approximately axially central portions of said eccentric body shafts;

a plurality of externally toothed gear, which are provided between said first and second supporting blocks, and which are eccentrically rotated around said main rotational shaft in a rotatable fitting relation between said eccentric body bearing holes formed thereon and said eccentric bodies through said eccentric body bearings; and an internal gear fixed on said casing and internally meshing with said externally toothed gears;

the improvement wherein said carrier body comprises carrier pins separately from said first and second supporting blocks; and said first and second supporting blocks are rigidly connected to each other by said carrier pins passing through carrier pin holding holes formed on said first and second supporting blocks;

said eccentric body shaft bearing holes, said eccentric body bearing holes and said carrier pin holding holes are made to be through-holes;

among said holes, said eccentric body shaft bearing holes formed on said first and second supporting blocks, and said eccentric body bearing holes formed on said externally toothed gear are disposed along a same circumference at a same pitch;

said carrier pin holding holes formed on said first and second supporting blocks are disposed along a same circumference at a same pitch;

wherein respective diameters of said eccentric body shaft bearing holes, said eccentric body bearing holes and said carrier pin holding holes are configured such that when said first and second supporting blocks and said externally toothed gear are appropriately arranged in predetermined axial positions thereof, diameters of said eccentric body shaft bearing holes formed on said first and second supporting blocks and diameters of said eccentric body bearing holes formed on said externally toothed gears are at least a same diameter in a machining direction, wherein said diameters can be simultaneously machined, and wherein the diameters of said carrier pin holding holes formed on said first and second supporting blocks are also at least a same diameter in a machining direction, such that said diameters can be simultaneously machined, and wherein respective outside diameters of said first and second supporting blocks are set to be smaller than root diameters of said external teeth of said externally toothed gear, and wherein a teeth number of each of said externally toothed gears is set to be an integral magnification of the number of said externally toothed gears, and a teeth number difference between said internal gear and said externally toothed gear is set to be the integral magnification of the number of said externally toothed gear.

4. In a transmission comprising:

a casing;

a main rotational shaft having a tip thereof inserted into said casing;

a first supporting block and a second supporting block, which are disposed around said main rotational shaft in an axially spaced apart manner, and which are rotatably supported by said casing through respective bearings;

a carrier body which rigidly connects said first supporting block with the second supporting block;

a plurality of eccentric body shafts, which are disposed along a circumference coaxial to said main rotational shaft, and which are rotatably supported at both the ends thereof by eccentric body shaft bearing holes formed on said first and second supporting blocks, and rotated in interlocking relation with said main rotational shaft;

eccentric bodies respectively provided at approximately axially central portions of said eccentric body shafts;

a plurality of externally toothed gear, which are provided between said first and second supporting blocks, and which are eccentrically rotated around said main rotational shaft in a rotatable fitting relation between said eccentric body bearing holes formed thereon and said eccentric bodies through said eccentric body bearings; and an internal gear fixed on said casing and internally meshing with said externally toothed gears;

the improvement wherein said carrier body comprises carrier pins separately from said first and second supporting blocks; and said first and second supporting blocks are rigidly connected to each other by said carrier pins passing through carrier pin holding holes formed on said first and second supporting blocks;

said eccentric body shaft bearing holes, said eccentric body bearing holes and said carrier pin holding holes are made to be through-holes;

among said holes, said eccentric body shaft bearing holes formed on said first and second supporting blocks, and said eccentric body bearing holes formed on said externally toothed gear are disposed along a same circumference at a same pitch;

said carrier pin holding holes formed on said first and second supporting blocks are disposed along a same circumference at a same pitch;

wherein respective diameters of said eccentric body shaft bearing holes, said eccentric body bearing holes and said carrier pin holding holes are configured such that when said first and second supporting blocks and said externally toothed gears are appropriately arranged in predetermined axial positions thereof, diameters of said eccentric body shaft bearing holes formed on said first and second supporting blocks and diameters of said eccentric body bearing holes formed on said externally toothed gear are at least a same diameter in a machining direction, such that said diameters can be simultaneously machined; and and wherein diameters of said carrier pin holding holes formed on said first and second supporting blocks are also at least a same diameter in a machining direction, wherein said diameters can be simultaneously machined, and wherein respective outside diameters of said first and second supporting blocks are set to be smaller than the root diameters of said external teeth of said externally toothed gear; and a teeth number of each of said externally toothed gears is set to be an integral magnification of the number of said externally toothed gears, and a teeth number difference between said internal gear and said externally toothed gear is set to be the integral magnification of the number of said externally toothed gear.

* * * * *